United States Patent
Indiresan et al.

(10) Patent No.: US 11,223,564 B2
(45) Date of Patent: Jan. 11, 2022

(54) UNEQUAL COST LOAD BALANCING FOR REDUNDANT VIRTUALIZED FABRIC EDGE DEVICES

(71) Applicant: Cisco Technology, Inc., San Jose, CA (US)

(72) Inventors: Atri Indiresan, Sunnyvale, CA (US); Roberto Mitsuo Kobo, Pleasanton, CA (US); Sanjay Kumar Hooda, Pleasanton, CA (US); Anton Smirnov, Braine-l'Alleud (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/567,324

(22) Filed: Sep. 11, 2019

(65) Prior Publication Data
US 2021/0075728 A1 Mar. 11, 2021

(51) Int. Cl.
*H04L 12/803* (2013.01)
*H04L 12/931* (2013.01)
*H04L 29/12* (2006.01)
*H04L 12/939* (2013.01)

(52) U.S. Cl.
CPC .......... *H04L 47/125* (2013.01); *H04L 49/354* (2013.01); *H04L 49/552* (2013.01); *H04L 49/70* (2013.01); *H04L 61/2592* (2013.01); *H04L 61/255* (2013.01); *H04L 61/6077* (2013.01)

(58) Field of Classification Search
CPC ... H04L 47/125; H04L 49/354; H04L 49/552; H04L 49/70; H04L 61/2592; H04L 61/255; H04L 61/6077
See application file for complete search history.

(56) References Cited

U.S. PATENT DOCUMENTS

| | | | |
|---|---|---|---|
| 10,050,855 B1* | 8/2018 | Singh | H04L 45/026 |
| 2012/0182866 A1* | 7/2012 | Vinayagam | H04L 45/245 |
| | | | 370/228 |
| 2013/0021903 A1* | 1/2013 | Li | H04L 41/0668 |
| | | | 370/228 |
| 2014/0198636 A1* | 7/2014 | Thayalan | H04L 49/25 |
| | | | 370/228 |
| 2017/0078150 A1* | 3/2017 | Koganti | H04L 12/4633 |

OTHER PUBLICATIONS

Hafnew, Vedran "Cisco Campus Fabric Introduction" Apr. 5-7, 2017 (Year: 2017).*

* cited by examiner

*Primary Examiner* — Jeffrey M Rutkowski
*Assistant Examiner* — Basil Ma
(74) *Attorney, Agent, or Firm* — Meunier Carlin & Curfman LLC

(57) ABSTRACT

In one embodiment, a method comprises receiving traffic to send from a router to a host in the fabric edge network, wherein the fabric edge network comprises a plurality of switches and an inter-switch link (ISL); and sending the traffic from the router to the host via at least one of the switches based on the downlink connectivity of the host. Sending the traffic from the router to the host is performed without sending the traffic through the ISL. Sending the traffic from the router to the host comprises sending the traffic through the ISL when there is a link failure on a path between the router and the host.

13 Claims, 10 Drawing Sheets

11,223,564 B2

UNEQUAL COST LOAD BALANCING FOR REDUNDANT VIRTUALIZED FABRIC EDGE DEVICES

TECHNICAL FIELD

The present disclosure relates generally to packet switching network communications, especially in an enterprise fabric network environment.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

An enterprise fabric network uses a network overlay, which is a virtual network of interconnected nodes that share an underlying physical network. Examples of network overlays include Virtual Extensible LAN (VXLAN), Network Virtualization Using Generic Routing Encapsulation (NVGRE), Transparent Interconnection of Lots of Links (TRILL), and Location/Identifier Separation Protocol (LISP). LISP is a network architecture and set of protocols that creates two namespaces and uses two IP addresses: endpoint identifiers (EIDs), which are assigned to end hosts, and routing locators (RLOCs), which are assigned to physical devices (e.g., routers) that make up the underlay routing system.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1A:
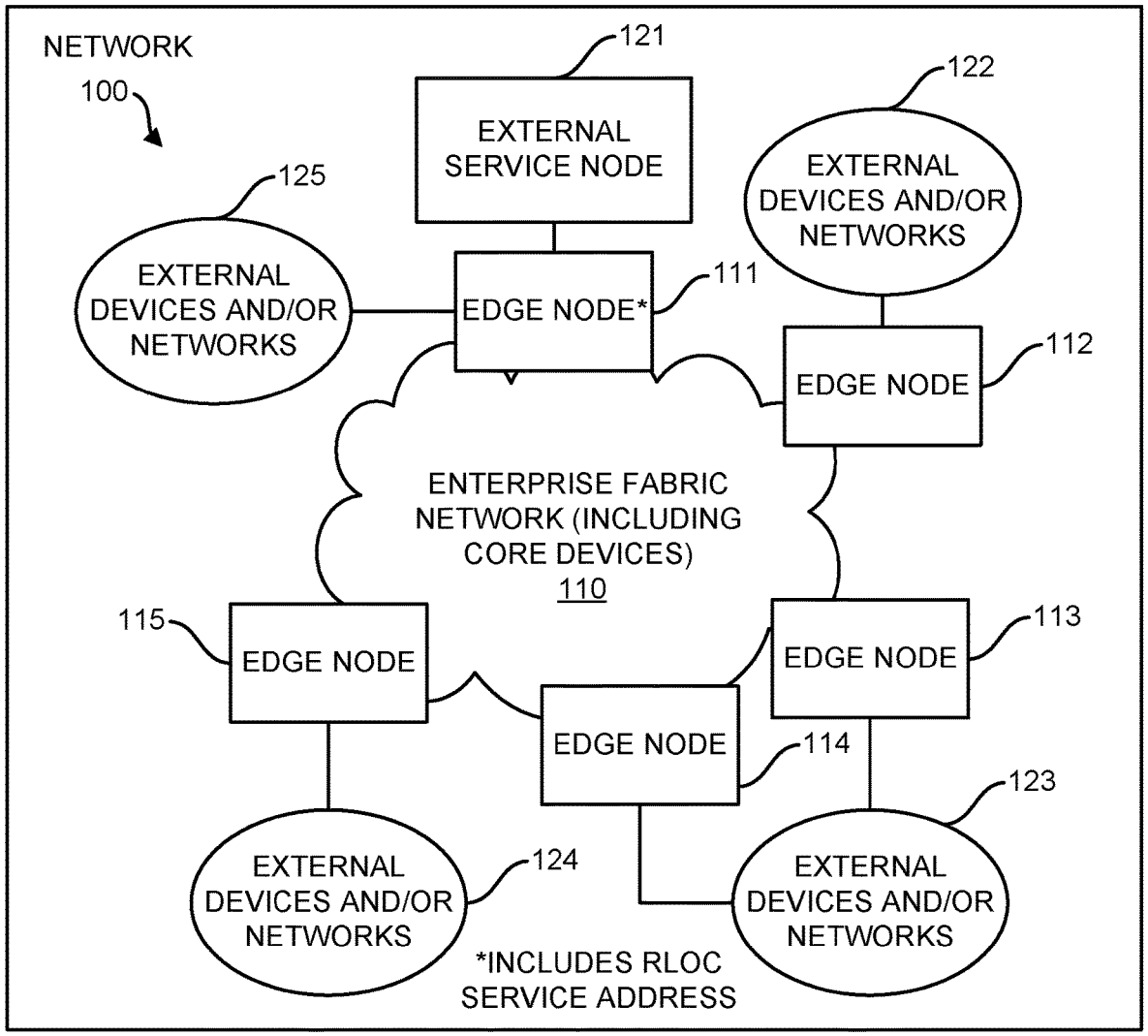
FIG. 1A illustrates an exemplary computing environment in which example embodiments and aspects may be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an implementation, a method is provided that may include receiving traffic to send from a router to a host in the fabric edge network, wherein the fabric edge network comprises a plurality of switches and an inter-switch link (ISL); and sending the traffic from the router to the host via at least one of the switches based on the downlink connectivity of the host.

In an implementation, a method is provided that may include receiving traffic to send from a router to a host in the fabric edge network, wherein the fabric edge network comprises a plurality of switches and an inter-switch link (ISL); determining that a path, for sending the traffic from the router to the host without sending the traffic through the ISL, is broken because a link on the path is failed; and sending the traffic from the router to the host via the ISL only in response to determining that the path is broken.

In an implementation, a system is provided that may include a plurality of switches; and an inter-switch link (ISL), configured such that only at least one of the plurality of switches is used to send traffic from a router to a host, based on the downlink connectivity of the host.

Example Embodiments

Disclosed are, inter alia, methods, apparatus, computer-storage media, mechanisms, and means associated with unequal cost load balancing for redundant virtualized fabric edge devices in an enterprise fabric network environment (e.g., overlay network environment). Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, application-specific integrated circuits (ASICs), methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described herein embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block diagrams and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required. Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

In one embodiment, the enterprise fabric network uses Locator/ID Separation Protocol (LISP), a network architecture and set of protocols that uses different overlay and underlay namespaces and a distributed mapping database for converting an overlay address to an underlay address. LISP is described in Farinacci et al., "The Locator/ID Separation Protocol (LISP)," RFC 6830, The Internet Society, Reston, Va., January 2013. Therein, RFC 6830 defines a routing locator (RLOC) as an Internet Protocol version 4 (IPv4) or version 6 (IPv6) address of an egress tunnel router (ETR).

In one embodiment, the enterprise fabric network uses a network overlay different than LISP, such as, but not limited to Virtual Extensible LAN (VXLAN), Network Virtualization Using Generic Routing Encapsulation (NVGRE), and Transparent Interconnection of Lots of Links (TRILL).

FIG. 1A illustrates a network 100 operating according to one embodiment. As shown, network 100 includes an enterprise fabric network 110, which edge nodes 111-115 as well as multiple interconnecting core devices. Each of edge nodes 111-115 provides interfaces to external devices (e.g., end user devices, service nodes) and/or networks 122-125. As shown, edge node 111 provides an interface to and from external (that is, external to enterprise fabric network 110) service node 121. In one embodiment, external service node 121 has an enterprise network address that is associated with edge node 111 to provide access by enterprise fabric network 110 to service node 121. In one embodiment, enterprise fabric network 110 uses LISP, and the service address is an RLOC.

Figure 1B:
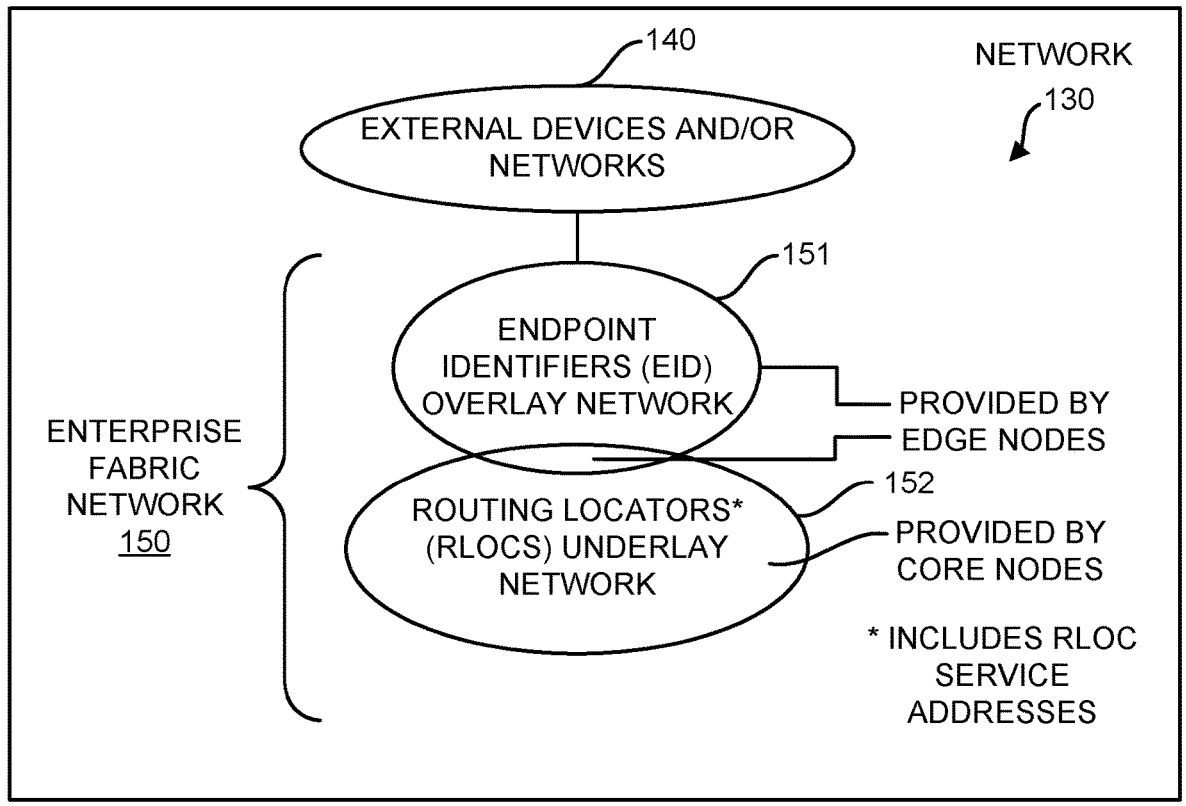
FIG. 1B illustrates an exemplary computing environment in which example embodiments and aspects may be implemented.

FIG. 1B illustrates another view of a network 130 operating according to one embodiment. Shown in FIG. 1B are enterprise fabric network 150 and external devices and/or networks 140. In one embodiment, LISP endpoint identifiers (EIDs) are used by external devices and/or networks as well as the overlay network of enterprise fabric network 150. Edge nodes of enterprise fabric network 150 use EIDs for the overlay portion of the enterprise fabric network 150 and a mapping database to convert an EID to a LISP RLOC used by the underlay network of enterprise fabric network 150 to route packets therein. Thus, an edge node is part of both the overlay and underlay networks of the enterprise fabric network 150 as well as being an interface between overlay and underlay networks. In one embodiment, an RLOC is expanded to include an address of a service to be applied to a packet via a service node.

Figure 1C:
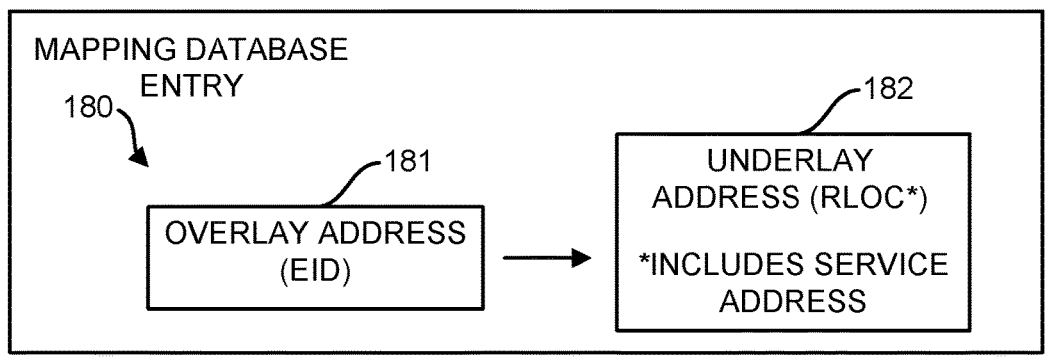
FIG. 1C illustrates a mapping database entry.

FIG. 1C illustrates a mapping database entry 180 according to one embodiment. An overlay address 181 (e.g., LISP EID) is mapped to an underlay address 182 (e.g., LISP RLOC expanded to include service addresses).

Figure 2A:
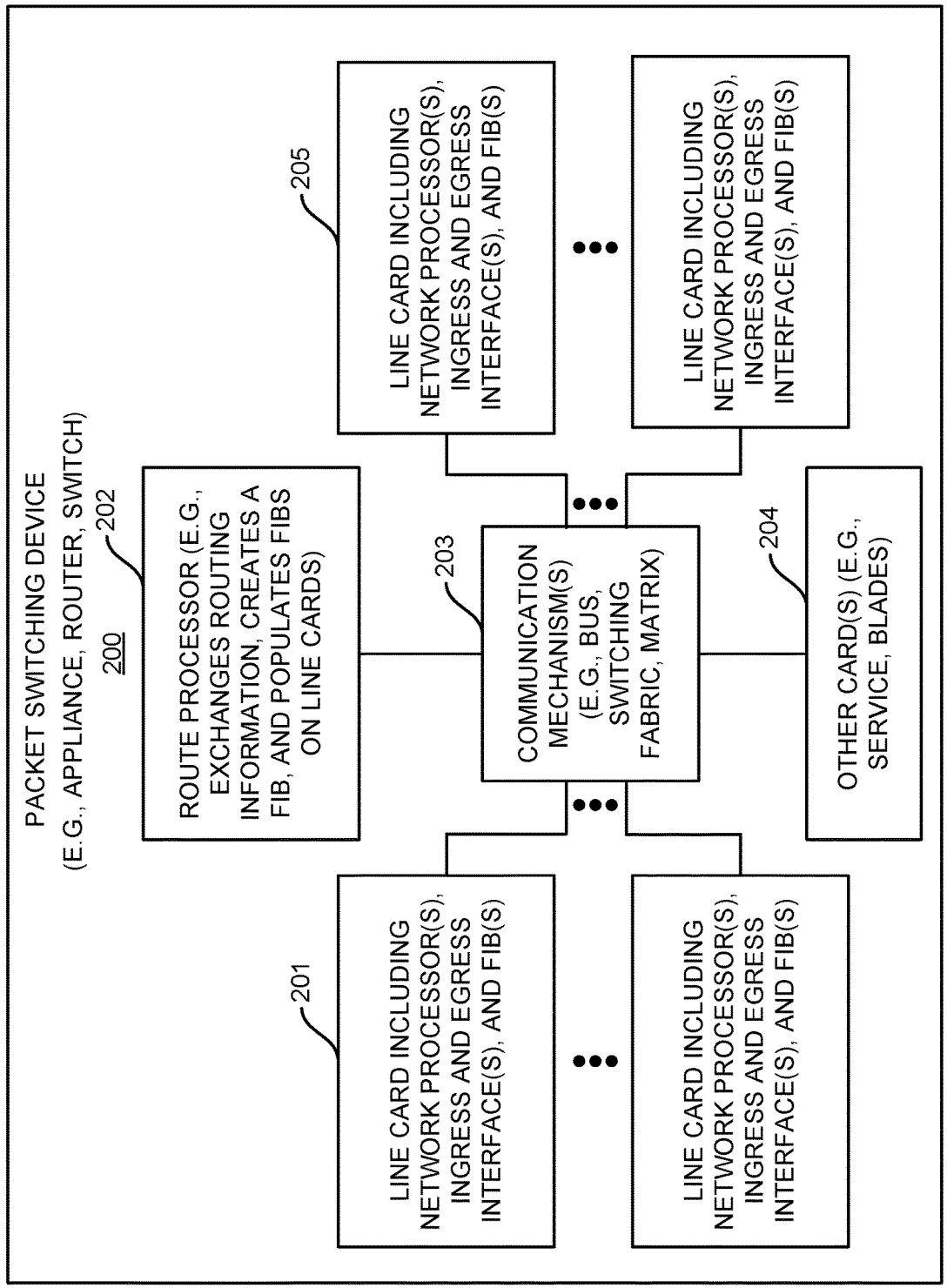
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment in an enterprise fabric network environment. Packet switching device 200 also has a control plane with one or more processing elements 202 for managing the control plane and/or control plane processing of packets in an enterprise fabric network environment. Packet switching device 200 also includes other cards 204 (e.g., service cards, blades) which include processing elements that are used in one embodiment to process packets in an enterprise fabric network environment, and some communication mechanism 203 (e.g., bus, switching fabric, matrix) for allowing its different entities 201, 202, 204, and 205 to communicate. In one embodiment, route processor 202 and/or line card(s) 201 perform lookup operations in a mapping database.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform packet processing operations, including, but not limited to, determining how to ingress and/or egress process packets. Even though the term FIB (forwarding information base) includes the word "forwarding," this information base typically includes other information describing how to process corresponding packets.

Figure 2B:
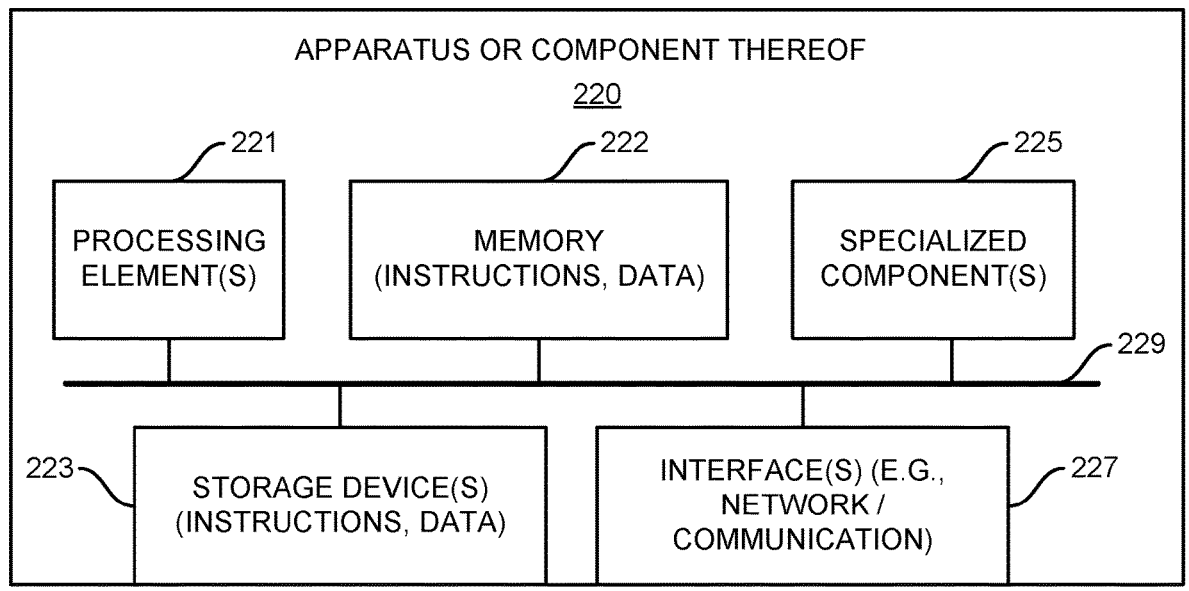
FIG. 2B illustrates an apparatus or component thereof according to one embodiment.

FIG. 2B illustrates an apparatus 220 or component thereof according to one embodiment. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

In order to improve scale and reliability (node redundancy), it is a common practice to virtualize two or more redundant routers and/or switches as single logical entity in various network topologies. From an operations perspective, it provides a unified control plane with stateful switchover (SSO) and is a fully distributed forwarding architecture that increases overall network bandwidth. A common characteristic of technologies (e.g., virtual switching systems (VSS), virtual port-channel (vPC), and StackWise Virtual) that provide this capability is an inter-switch link (ISL) (which may be a physical interface, a PortChannel, or a logical tunnel, for example) to handle traffic that ingresses on one switch and egresses on another. The ISL has limited bandwidth relative to the forwarding capacity of the switch, and so, it is highly desirable that most to the traffic remain within the same switch, and not traverse the ISL. In case the northbound and southbound interfaces are PortChannels that are homed on both switches, it is possible to load balance traffic using a "prefer local" heuristic, so that the local PortChannel interface(s) will be selected, if available.

However, not all devices connected to the redundant switches have multiple connections to be dual-homed or it not may be practical or cost effective to introduce an intermediate switch to provide multi-homing capability and so, traffic may need to traverse the ISL, depending on the where the traffic arrives. Consider the case of a VXLAN-based fabric (software-defined access (SDA), application centric infrastructure (ACI), etc.), that uses such a redundant virtual tunnel end point (VTEP) at the access layer (ACI leaf, SDA fabric edge node). For simplicity, dual switches with an ISL in between are contemplated, but the concepts can be readily generalized for greater degrees of redundancy, and may be generalized to cover ACI or border gateway protocol (BGP) ethernet virtual private network (EVPN), or other similar IP-based fabrics.

The fabric core is usually an equal-cost multi-path routing (ECMP) IP network, and southbound traffic from a core router to the egress VTEP will be connected to both switches in the VTEP. For single-homed devices, there is a 50% chance of the core router sending the packet to the wrong edge switch, which will not impact correctness of forwarding, but will consume bandwidth in the ISL.

It is desirable to minimize ISL bandwidth usage for single-homed devices and multi-homed devices. As described herein, unequal cost load balancing is provided for redundant virtualized fabric edge devices by selectively using and advertising a RLOC/VTEP-based on the connectivity of the end devices, thereby minimizing bandwidth utilization of the ISL. The advertised RLOC is used to polarize the traffic such that it gets delivered to the switch (es) that are directly connected to the end device. If the end device is single-homed, it is advertised by the switch RLOC, whereas when it is connected to a combination of the switches it is advertised by the RLOC representing the respective combination.

Figure 3:
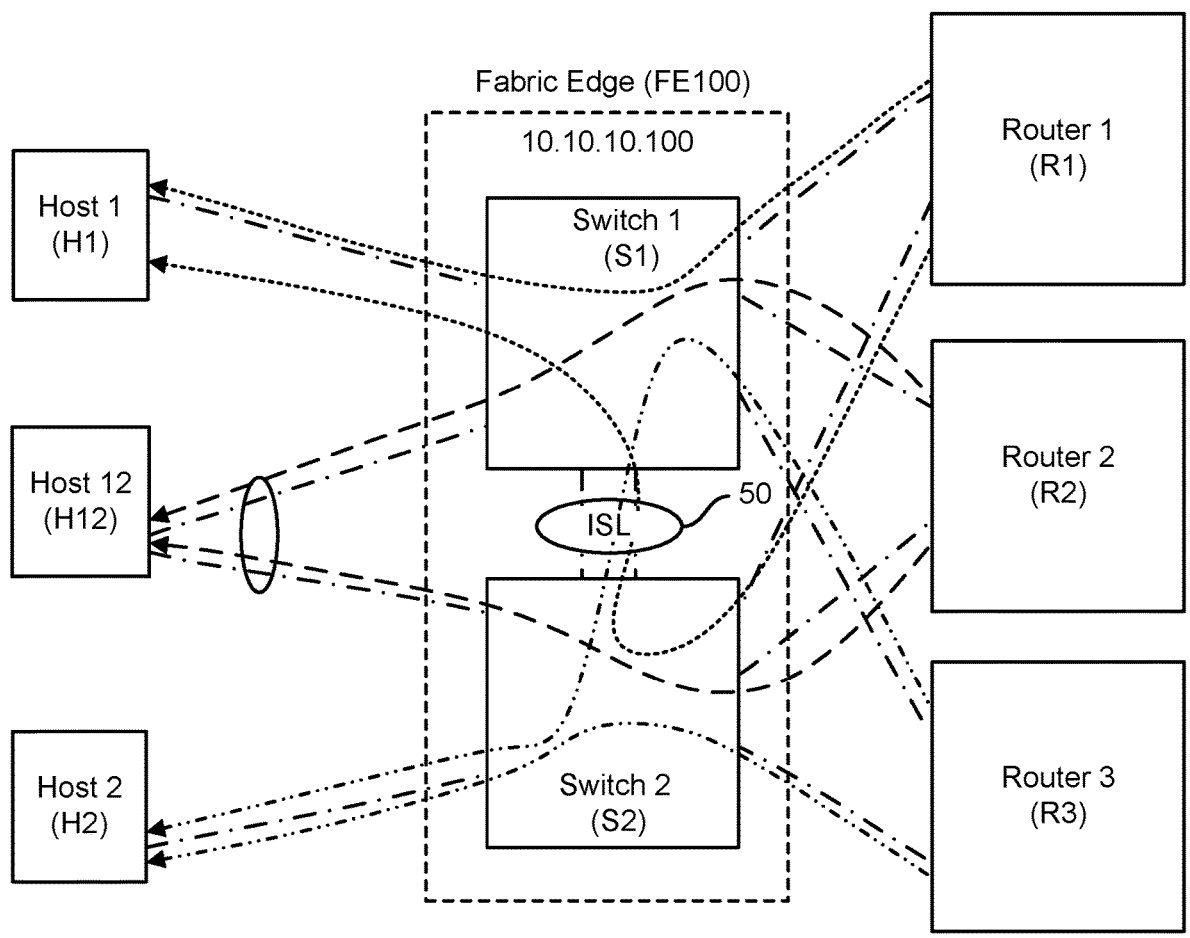
FIG. 3 is an illustration showing traffic from core routers to hosts that may traverse the inter-switch link (ISL)

FIG. 3 is an illustration 300 showing arrows representing various traffic from core routers R1, R2, and R3 to hosts H1, H12, and H2 that may traverse the ISL 50 and/or switches S1 and/or S2 of fabric edge FE100.

Conventionally, traffic from core routers R1, R2, and R3 to hosts H1, H12, and H2 may traverse the ISL 50. This has the side effect of having arbitrary load balancing, which causes excessive utilization of the ISL 50 for single-homed devices. FIG. 3 shows a fabric edge FE100 comprising switch S1 and switch S2. Switch S1 and switch S2 may be edge switches or routers, depending on the implementation.

The fabric edge FE100 may be LISP xTR, or VXLAN VTEP, for example. In VXLAN and LISP, tunnel endpoints are identified by the IP address(es) of the fabric edge devices. These devices are called ingress/egress VTEPs in VXLAN and ingress/egress Tunnel Routers (ITR/ETR, collectively xTR) in LISP terminology. The IP addresses in LISP are also called source and destination RLOCs. These terms may be used interchangeably, since the concepts are the same.

Switch S1 and switch S2 are logically a single fabric edge, connected by the ISL 50. Routers R1, R2, and R3 are core routers. Although three routers R1, R2, and R3 are shown, this is not intended to be limiting, as any number of routers may be used depending on the implementation or network topology.

Traffic from the core is destined to egress VTEP Loopback0 (10.10.10.100) and is load balanced at random, and may take the link ISL 50 to switch S1 or switch S2. Traffic to dual-homed host H12 does not traverse the ISL 50 due to "prefer local" load balancing across the EtherChannel. Traffic to single-homed hosts H1 and H2 has a 50% chance of traversing the ISL 50. Due to the limited bandwidth of the ISL 50, this is not desirable. ISL bandwidth utilization and minimization are thus addressed herein, in particular, for single-homed end devices.

When switches are connected by an ISL, the internal switch interconnection bandwidth cannot be considered "infinite", i.e., much higher than that of network ports. It becomes advantageous to attract traffic for decapsulation to the switch where the overlay device is connected, and only for dual-connected devices, load balancing between switches makes sense.

Figure 4:
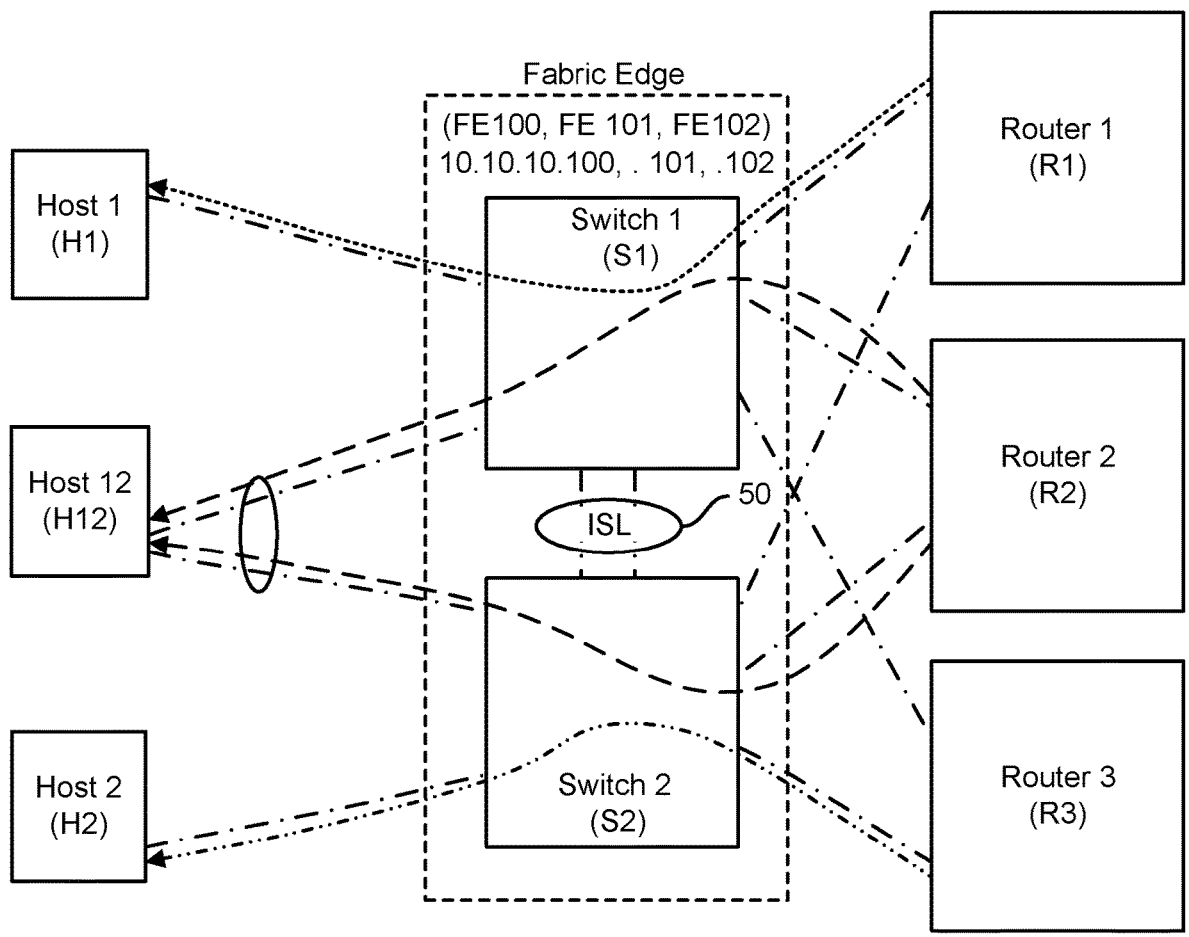
FIG. 4 is an illustration showing traffic from core routers to hosts that do not traverse the ISL.

FIG. 4 is an illustration 400 showing arrows representing traffic from core routers R1, R2, and R3 to hosts H1, H12, and H2 that do not traverse the ISL 50 and instead only traverse switch S1 or switch S2 of fabric edge FE100. The ISL 50 is used only when there is no other choice (e.g., in the case of a link failure as described with respect to FIG. 7).

In FIG. 4, traffic from the core routers R1, R2, and R3 to the hosts H1, H12, and H2 does not traverse the ISL 50. The fabric edge FE100 has three loopback addresses. Loopback0 is 10.10.10.100 for dual-homed hosts, such as host H12. Loopback1 is 10.10.10.101 for single-homed hosts on switch S1. Loopback2 is 10.10.10.102 for single-homed hosts on switch S2. With a suitable interior gateway protocol (IGP) configuration, traffic to Loopback0 takes either interface, traffic to Loopback1 only goes to switch S1, and traffic to Loopback2 only goes to switch S2. None of the traffic from the core routers R1, R2, and R3 to the hosts H1, H12, and H2 traverses the ISL 50, except for link failure scenarios.

Figure 5:
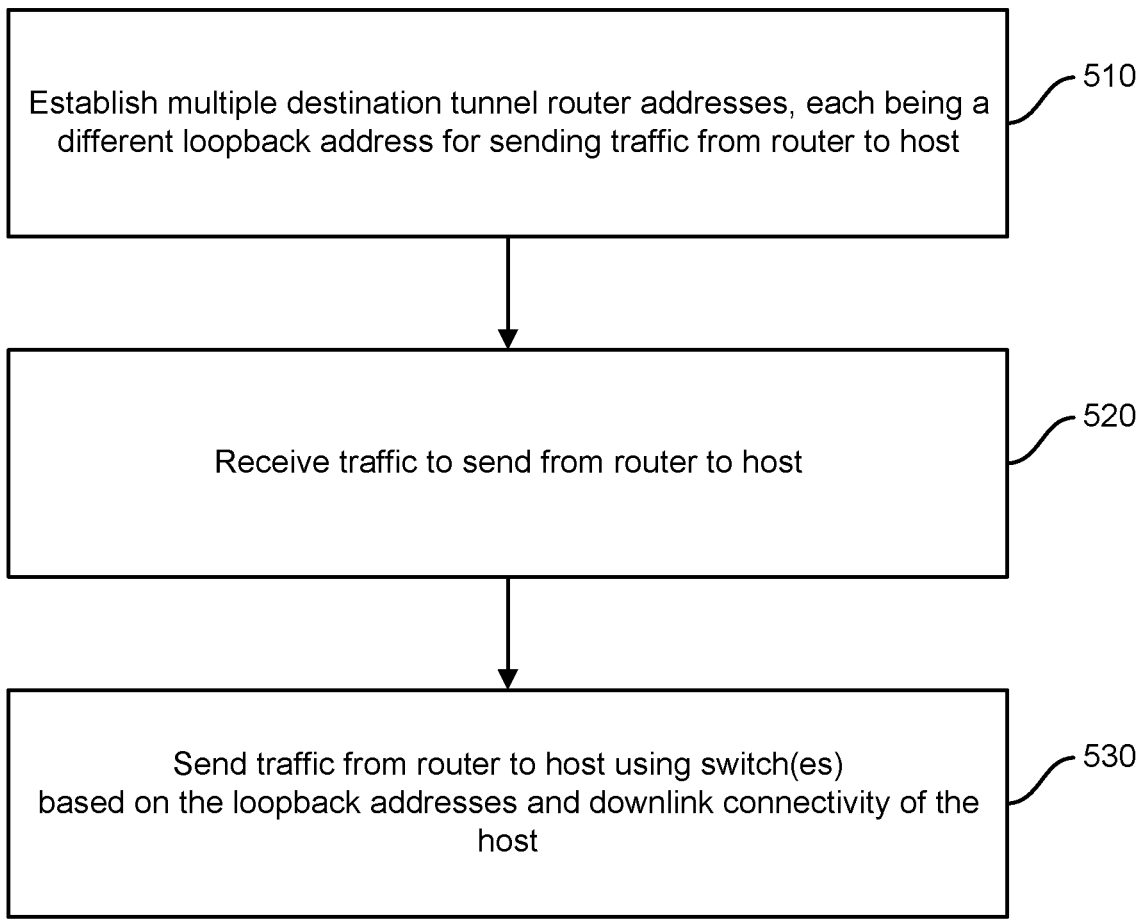
FIG. 5 is an operational flow of an implementation of a method of load balancing according to an embodiment.

FIG. 5 is an operational flow of an implementation of a method 500 of load balancing according to an embodiment. At 510, multiple destination tunnel router addresses are established. Loopback addresses Loopback0, Loopback1, and Loopback2 are examples of such destination tunnel router addresses. At 520, traffic is received at one or more of the core routers, for sending from a router to a host. At 530, the traffic is sent from the router to the host, using at least one of the switches, based on the downlink connectivity of the host to which the traffic is destined.

Multiple destination tunnel router addresses are used to send traffic to different switches in a composite FE device, based on the downlink connectivity of these end devices.

Note that typically, in some implementations, there will be two switches and three RLOCs. An implementation involves (Combination (n, r)) RLOCs, where "n" is the number of edge switches providing virtualized connectivity to the end devices and "r" is the maximum connectivity of the end devices. In this case, if an end device is single-homed, it is advertised by the corresponding switch RLOC, whereas when it is connected to a combination of the switches it is advertised by the respective combination.

Figure 6:
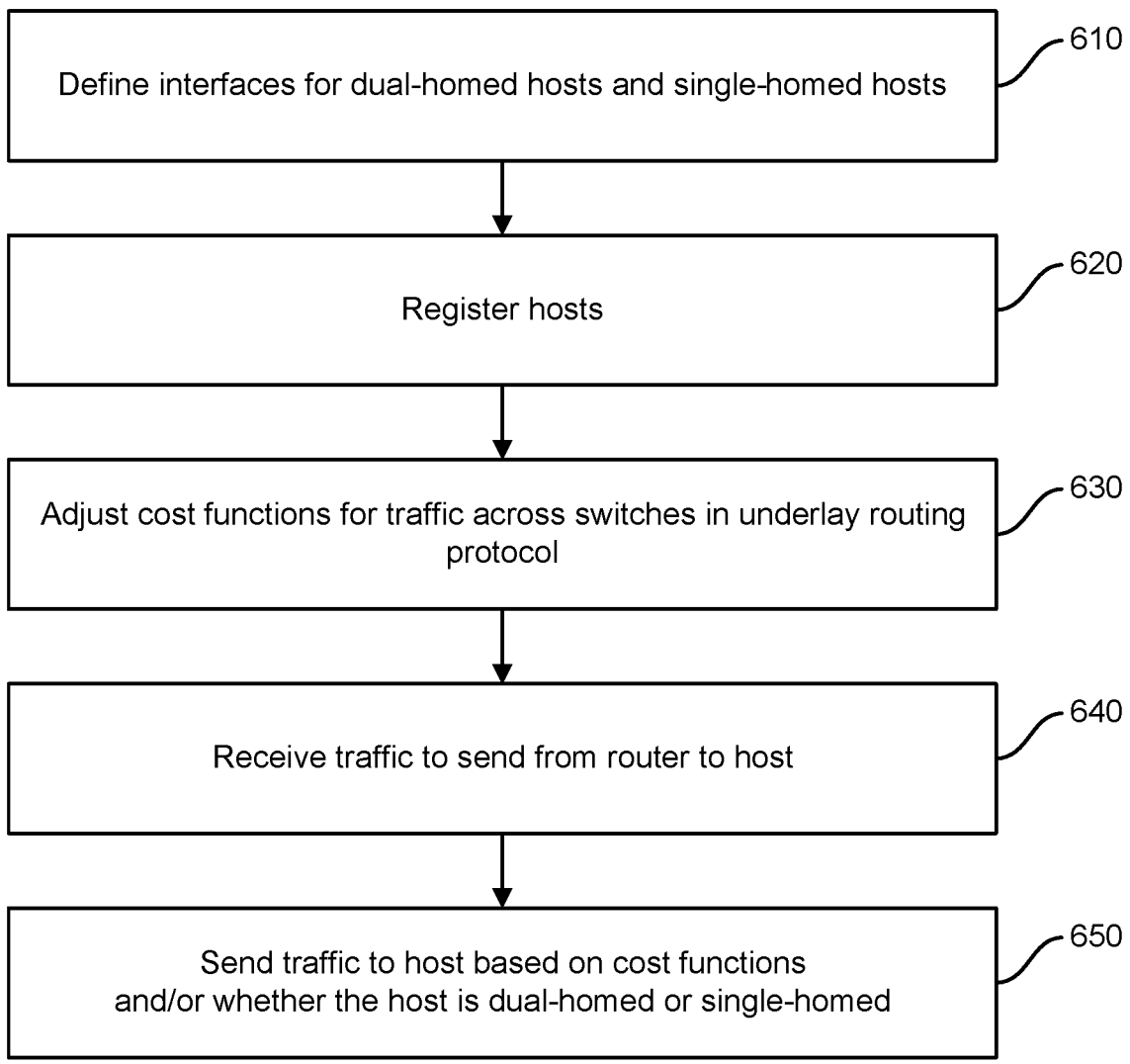
FIG. 6 is an operational flow of another implementation of a method of load balancing according to an embodiment.

FIG. 6 is an operational flow of another implementation of a method 600 of load balancing according to an embodiment.

At 610, interfaces for dual-homed devices and for single-homed devices (e.g., hosts) are defined. Continuing with the example above, define three interfaces for the RLOC of LISP registrations: (a) Loopback0 for dual-homed devices, (b) Loopback1 for devices connected only to switch1, (c) Loopback2 for devices connected only to switch S2. Note that this may be generalized for a virtual switch with more than two switches, with one RLOC for each switch, and one for each combination of ports that have downlink port channels across switches.

At 620, the various devices are registered. When registering local devices with the host tracking database (i.e., MSMR (map-server/map-resolver) in LISP terms), LISP will use the appropriate loopback interface address as above. Encapsulating routers will send traffic to the correct destination RLOC, based on whether the device is dual-homed, or single-homed on either switch.

At 630, cost functions for traffic across switches in the underlay routing protocol are adjusted. Continuing with the example above, in the underlay routing protocol, the cost function is adjusted such that: (a) Loopback0 is equal cost across all the core interfaces on switch S1 and switch S2, (b) Loopback1 is low cost for the core interfaces on switch S1, and high cost for switch S2, and (c) Loopback2 is low cost for the core interfaces on switch S2, and high cost for switch S1.

At 640, traffic to be sent from a router to a device such as a host is received at one or more of the core routers.

At 650, the traffic is sent to the destination (e.g., the host) based on whether the device (e.g., the host) is dual-homed or single-homed. In this manner, packets from the core to the dual ETR will select the appropriate switch with a direct connection to the single-homed end devices, and either switch in the case of dual-homed devices. In conjunction with "prefer local" on downlink port channels, this will minimize utilization of the ISL. However, the ISL will be used when either switch loses its uplink ports, and so, this solution remains resilient to link failures.

Figure 7:
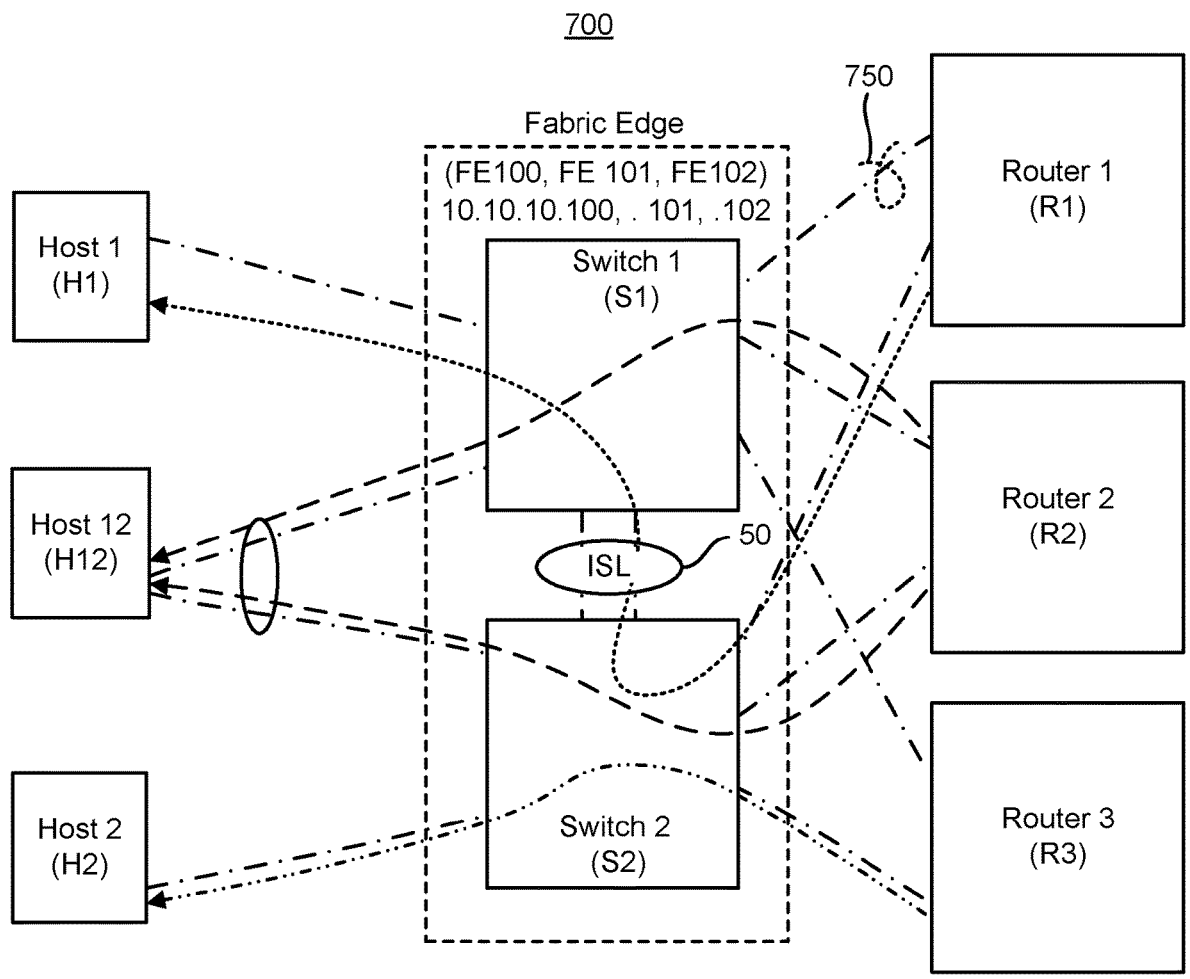
FIG. 7 is an illustration showing traffic in an example failure scenario.

FIG. 7 is an illustration 700 showing traffic in an example failure scenario in which a link 750 between router R1 and switch S1 is failed, such that the path between router R1 and switch S1 is broken. Because the link from router R1 to switch S1 is failed, traffic to router R1 can no longer go to switch S1. However, the route via switch S2 and the ISL 50 is still available, and traffic is automatically routed that way. All other link failures will be handled as expected, with only the impacted traffic taking the ISL 50. All other traffic will continue to take the appropriate link.

Figure 8:
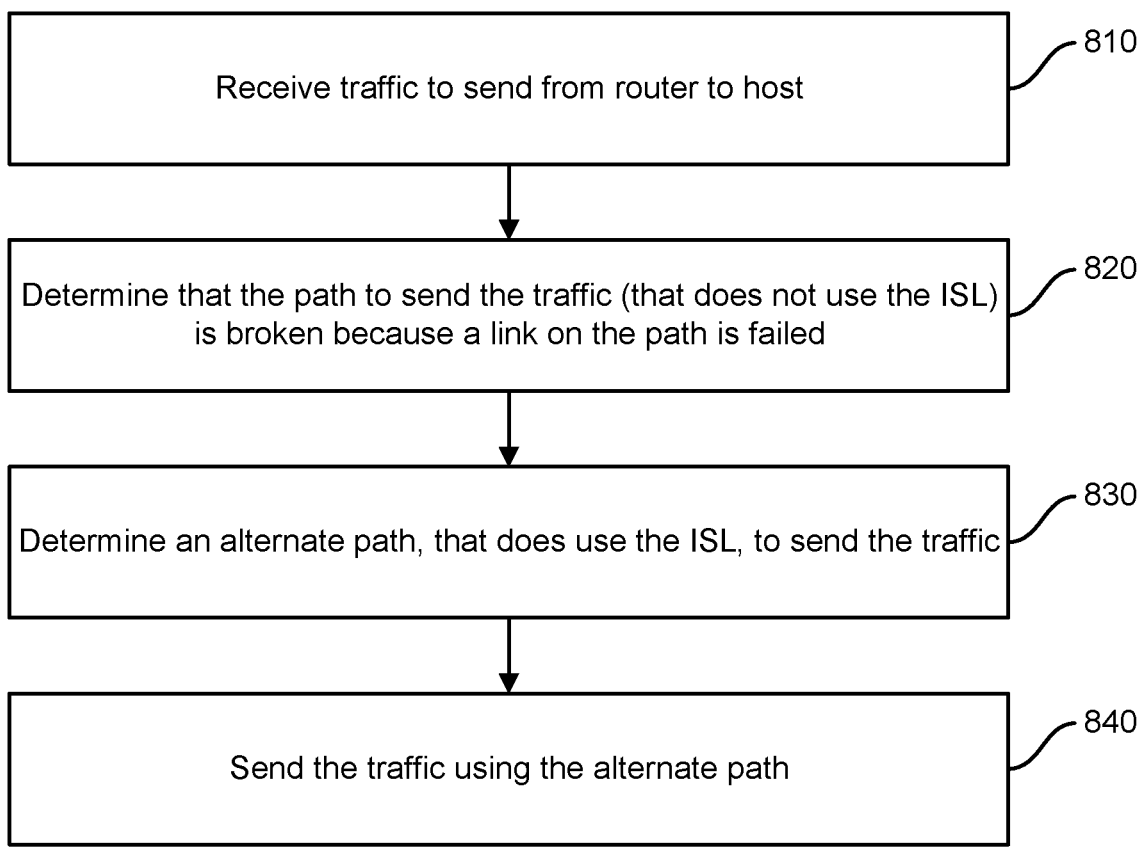
FIG. 8 is an operational flow of an implementation of a method of load balancing in a failure scenario according to an embodiment.

FIG. 8 is an operational flow of an implementation of a method 800 of load balancing in a failure scenario according to an embodiment.

At 810, traffic is received to be sent from a router to a host. At 820, it is determined that the appropriate path on which to route the traffic is broken because a link on the path is failed. This appropriate path does not use the ISL.

At 830, an alternate path (that does not use the failed link), that does use the ISL, is determined for sending the traffic. At 840, the traffic is sent to its destination using the alternate path.

The described cost manipulation can be directly achieved in the distance-vector routing protocols (EIGRP/BGP/RIP) by manipulating cost of reaching loopbacks for advertisements sent out of ports on different switches. For the link-state routing protocols (ISIS/OSPF) manipulating the cost is not as easy, but also possible.

As an example, in OSPF, the FE and routers will have to be configured appropriately so that the link priorities are suitable. In one case, each FE configures two routers —one for each switch. All routes are in area 0, but the preferred router attracts traffic to the correct loopback interface. In a second case, each switch in the FE is in a different area, and Loopback0 is in area 0, and is redistributed to both. The end result is effectively the same. The first case is likely simpler, but there could be other advantages in the second case. These configurations are purely illustrative and there could be other ways of achieving the same effect (e.g., by manipulating priorities for static routes from the core routers to the loopback interfaces). In addition, similar techniques could be applied to IS-IS.

While the description above uses the example of a LISP mapping database to associate the endpoint ID (EID) to the appropriate RLOC to achieve unequal cost load balancing, the same principles of associating different VTEPs to end points may be applied to other control planes such as BGP-EVPN or ACI. It is also readily applied to other IP-based tunnels, or even MPLS (multiprotocol label switching) architecture, where different labels for IGP label switched paths could be used for different hosts/prefixes behind the redundant provider edge (PE) routers.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. However, the present invention can be used in connection with any suitable wireless network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for unequal cost load balancing for redundant virtualized fabric edge devices, the method comprising:
    establishing a plurality of destination tunnel router addresses, wherein each of the destination tunnel router addresses is a different loopback address in a fabric edge network, wherein at least one of the destination tunnel router addresses is for a single-homed host, and wherein at least another of the destination tunnel router addresses is for a dual-homed host;
    receiving traffic to send from a router to a host through the fabric edge network, wherein the router and the host are outside the fabric edge network, wherein the fabric edge network comprises a plurality of switches and an inter-switch link (ISL) that are inside the fabric edge network, and wherein the host is one of a single-homed host or a dual-homed host; and
    sending the traffic from the router to the host via at least one of the switches based on the downlink connectivity of the host, wherein each loopback address directs traffic only to at least one of the switches and not to the ISL, and wherein sending the traffic from the router to the host is performed without sending the traffic through the ISL,
    wherein different costs are assigned to each loopback address based on the downlink connectivity of the host, and
    wherein each destination tunnel router address is used to send the traffic to a different switch based on the downlink connectivity of the host and the cost assigned to each loopback address.

2. The method of claim 1, wherein the host is a single-homed host.

3. The method of claim 1, wherein the host is a dual-homed host.

4. The method of claim 1, wherein sending the traffic from the router to the host comprises sending the traffic through the ISL when there is a link failure on a path between the router and the host.

5. The method of claim 1, further comprising defining at least one interface for at least one dual-homed host, and at least one interface for at least one single-homed host.

6. The method of claim 5, further comprising adjusting cost functions for traffic across the switches in an underlay routing protocol.

7. The method of claim 6, wherein sending the traffic from the router to the host via at least one of the switches based on the downlink connectivity of the host further is based on whether the host is dual-homed or single-homed.

8. A method for unequal cost load balancing for redundant virtualized fabric edge devices, the method comprising:
    establishing a plurality of destination tunnel router addresses, wherein each of the destination tunnel router addresses is a different loopback address in a fabric edge network, wherein at least one of the destination tunnel router addresses is for a single-homed host, and wherein at least another of the destination tunnel router addresses is for a dual-homed host;
    receiving traffic to send from a router to a host through the fabric edge network, wherein the router and the host are outside the fabric edge network, wherein the fabric edge network comprises a plurality of switches and an inter-switch link (ISL) that are inside the fabric edge network, wherein each loopback address directs traffic only to at least one of the switches and not to the ISL, and wherein the host is one of a single-homed host or a dual-homed host;
    determining that a path for sending the traffic from the router to the host without sending the traffic through the ISL is broken because a link on the path is failed; and
    sending the traffic from the router to the host via the ISL only in response to determining that the path is broken,
    wherein different costs are assigned to each loopback address based on the downlink connectivity of the host, and wherein each destination tunnel router address is used to send the traffic to a different switch based on the downlink connectivity of the host and the cost assigned to each loopback address.

9. The method of claim 8, wherein the host is a single-homed host.

10. The method of claim 8, wherein the host is a dual-homed host.

11. The method of claim 8, further comprising determining an alternate path, that uses the ISL, to send the traffic in response to the determining that the path is broken.

12. A system for unequal cost load balancing for redundant virtualized fabric edge devices, the system comprising:
   a fabric edge network comprising:
      a plurality of switches; and
      an inter-switch link (ISL),
   wherein the fabric edge network comprises a plurality of loopback addresses, wherein different costs are assigned to each loopback address based on the downlink connectivity of the host, and wherein each loopback address directs traffic only to at least one of the switches and not to the ISL, and configured such that only at least one of the plurality of switches is used to send traffic from a router to a host via at least one of the switches based on the downlink connectivity of the host and the cost assigned to each loopback address, wherein the router and the host are outside the fabric edge network, wherein the host is one of a single-homed host or a dual-homed host, and wherein sending the traffic from the router to the host is performed without sending the traffic through the ISL.

13. The system of claim 12, further configured that traffic is only sent through the ISL when a path for sending the traffic from the router to the host without sending the traffic through the ISL is broken because a link on the path is failed.

* * * * *